US005671890A

United States Patent [19]

Cooper et al.

[11] Patent Number: 5,671,890

[45] Date of Patent: Sep. 30, 1997

[54] FUEL INJECTION NOZZLE

[75] Inventors: Richard Lloyd Cooper, Le Roy; James Zizelman, Honeoye Falls; Michael Raymond Salemi, Rochester; Jeffrey Mark Noll, Honeoye Falls; Edwin Antonio Rivera, Fairport, all of N.Y.

[73] Assignee: General Motors Corporation, Detroit, Mich.

[21] Appl. No.: 573,841

[22] Filed: Dec. 18, 1995

[51] Int. Cl.[6] .............................. F02M 61/08; F16K 51/00

[52] U.S. Cl. ...................................... 239/533.7; 239/533.9; 137/537; 251/284; 251/333

[58] Field of Search .............................. 137/537; 251/121, 251/284, 333; 239/533.1, 533.2, 533.3, 533.7, 533.9, 533.12, 584

[56] References Cited

U.S. PATENT DOCUMENTS

| | | | |
|---|---|---|---|
| 1,001,510 | 8/1911 | Curbey | 251/284 X |
| 1,544,219 | 6/1925 | Collar | 251/284 X |
| 2,520,092 | 8/1950 | Fredrickson et al. | 251/284 X |
| 4,408,772 | 10/1983 | Frelund | 239/533.12 X |
| 5,070,845 | 12/1991 | Avdenko et al. | 123/470 |
| 5,392,994 | 2/1995 | Zizelman et al. | 239/533.9 |

FOREIGN PATENT DOCUMENTS

| | | | |
|---|---|---|---|
| 564909 | 10/1944 | United Kingdom | 239/533.7 |

*Primary Examiner*—Andres Kashnikow
*Assistant Examiner*—Robin O. Evans
*Attorney, Agent, or Firm*—Karl F. Barr, Jr.

[57] ABSTRACT

A fuel injection system is disclosed having a fuel injection nozzle which receives pressurized fuel pulses from a source. The nozzle includes a body having a tubular nozzle body with a longitudinally extending opening extending therethrough. A valve seat is located between the upstream and downstream ends of the longitudinal opening in the valve body for engagement with a valve member to thereby regulate the flow of fuel through the opening. A downstream stop member includes a hollow cylinder with a diametrical member extending across one end. The cylindrical stop member is received over the downstream end of the nozzle body with the diametrically extending member disposed across the downstream end of the longitudinal opening to thereby limit the outward range of movement of the valve member from the opening. As a result, the valve member and the downstream end of the longitudinally extending opening define an annular fuel metering orifice therebetween to regulate the flow of fuel from the nozzle.

2 Claims, 4 Drawing Sheets

FUEL INJECTION NOZZLE

TECHNICAL FIELD

The invention is directed to a nozzle for discharging fuel to the intake system of an internal combustion engine.

BACKGROUND

In the fuel injection system set forth in U.S. Pat. No. 5,070,845 issued to Avdenko et al., a fuel system is disclosed having an injector for metering fuel to a plurality of fuel nozzles. Fuel is distributed through individual fuel lines and is discharged via the nozzles at locations adjacent the engine intake ports. The nozzle disclosed in Avdenko et al., has a body with a tubular seat member having a valve seat with an opening for the discharge of fuel therethrough. A popper valve member is operable, relative to the valve seat, to interrupt fuel flow through the opening and an extension spring anchored to the nozzle body and to the valve member urges the valve into a normally closed, seated position against the valve seat.

In operation, the valve member is moved from its closed, seated position on the valve seat when a minimum required opening pressure is achieved on its upstream side. Fuel flow through the nozzle is initiated upon movement of the valve member off of its associated valve seat. In its open position, the popper valve member does not operate as a fixed orifice and, therefore, cannot provide a flow metering function. The extent of valve movement depends upon the fuel pressure, resulting in fuel flow sensitivity through the nozzle.

SUMMARY OF THE INVENTION

The invention provides an improved nozzle suitable for use in a fuel injection system in which pressurized fuel is metered to a nozzle. According to the present invention a fuel injection nozzle includes a tubular body adapted to receive fuel, having a valve seat with an opening for discharging fuel. Disposed within the body is a popper valve assembly including a valve member engageable with the valve seat to interrupt the flow of fuel through the opening. An extension spring anchors the valve assembly to the body and biases the valve member into engagement with the valve seat.

The improved fuel injection nozzle of the present invention may include, as a feature, a downstream stop assembly applied over the outside diameter of the nozzle body adjacent the valve seat opening. The stop assembly is operable to limit travel of the poppet valve to a determined axial travel. Once against the poppet stop, the valve ceases to act as a fuel regulator and begins to function, in concert with the valve seat, as a fixed metering restriction. The downstream stop is constructed in a basket-like configuration with a single web contacting the downstream side of the ball to minimize fuel accumulation and disruption.

The improved fuel injection nozzle provided by the invention may include, as a further feature, a valve seat that is modified to include a wide angle, seating portion and a narrow angle, performance portion. The popper valve seats, to close off fuel flow through the opening, against the wide angle, seating portion of the modified valve seat. As the popper valve moves off of the valve seat to initiate fuel flow through the opening, the poppet valve ball moves axially into the narrow angle portion of the modified valve seat establishing a minimal radial clearance around the ball. The small clearance creates a restriction to fuel flow around the ball, thereby placing a significant force on the ball to drive it against the downstream web of the poppet stop. Fuel metering is established between the ball and the downstream edge of the narrow angle, performance portion.

These and other features, objects and advantages of this invention will be more apparent from the following detailed description and drawings.

DESCRIPTION OF THE PREFERRED EMBODIMENT

Figure 1:
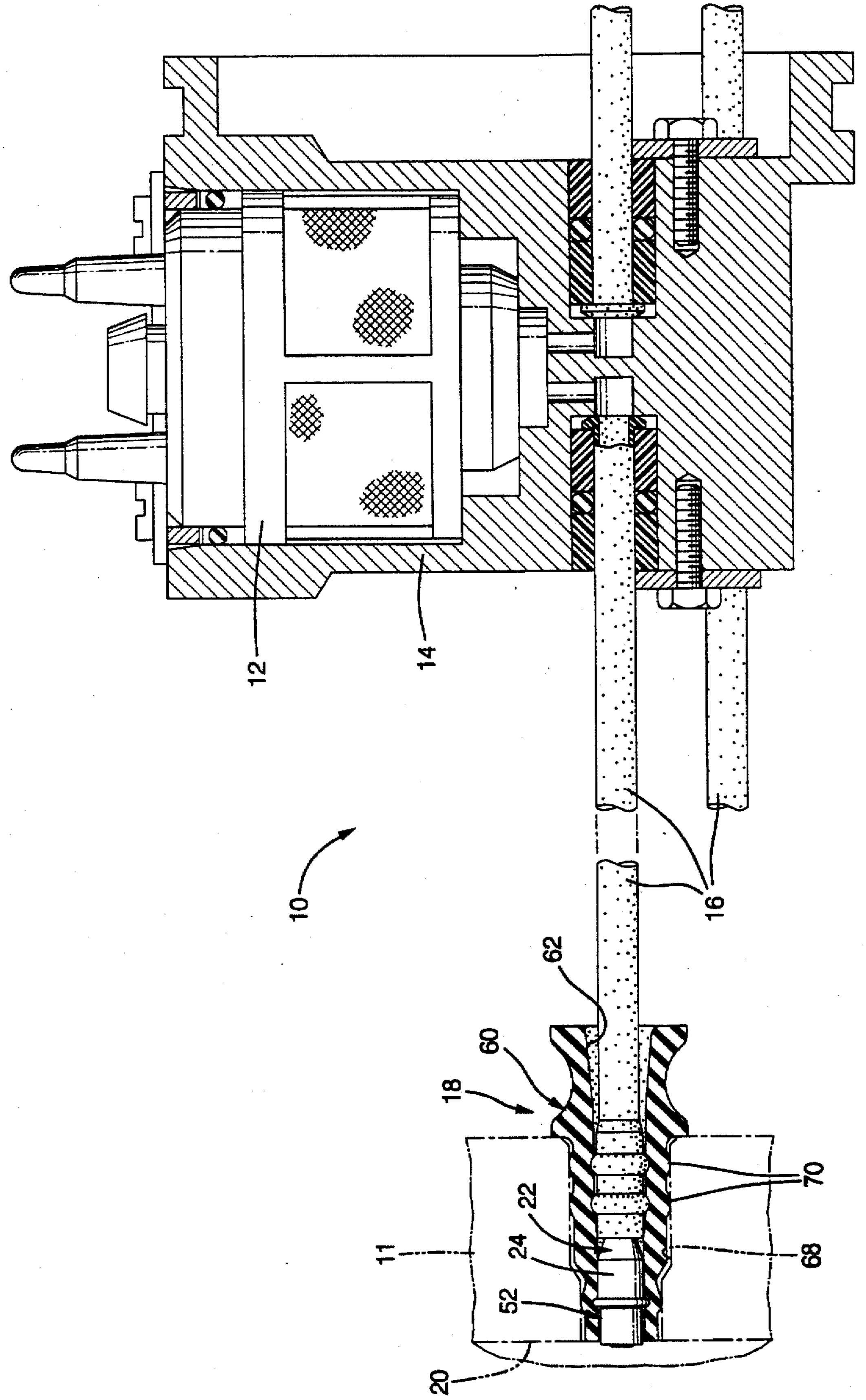
FIG. 1 shows a fuel injection system that meters fuel through a fuel line to a nozzle employing features of the present invention.

Referring to the drawings, FIG. 1 illustrates a fuel injection system, designated generally as 10, for delivery of fuel to an internal combustion engine 11. A fuel injector 12 is mounted in a fuel meter body 14 and is supplied fuel at a desired pressure. Injector 12 meters the fuel, in the form of pressurized pulses, to individual fuel injection lines 16. Each line terminates at a fuel injection nozzle 18 that operates to discharge the metered fuel into the air stream flowing through individual engine inlet ports 20 of the engine.

Figure 2:
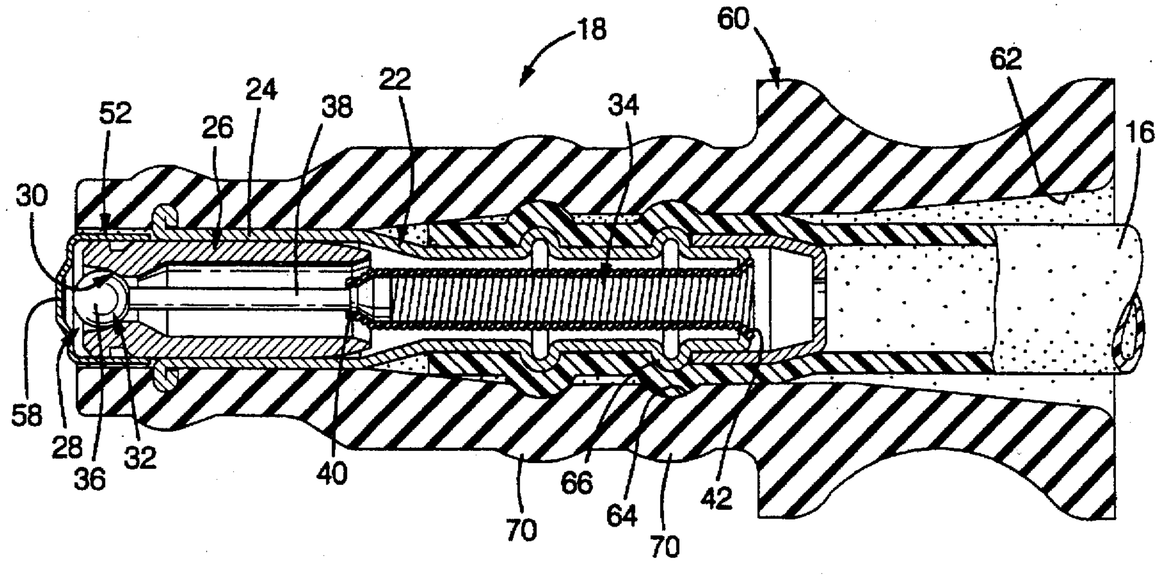
FIG. 2 is an enlarged, sectional view of a portion of the FIG. 1 nozzle removed from the engine and the fuel meter body, showing details of its construction.
Figure 3:
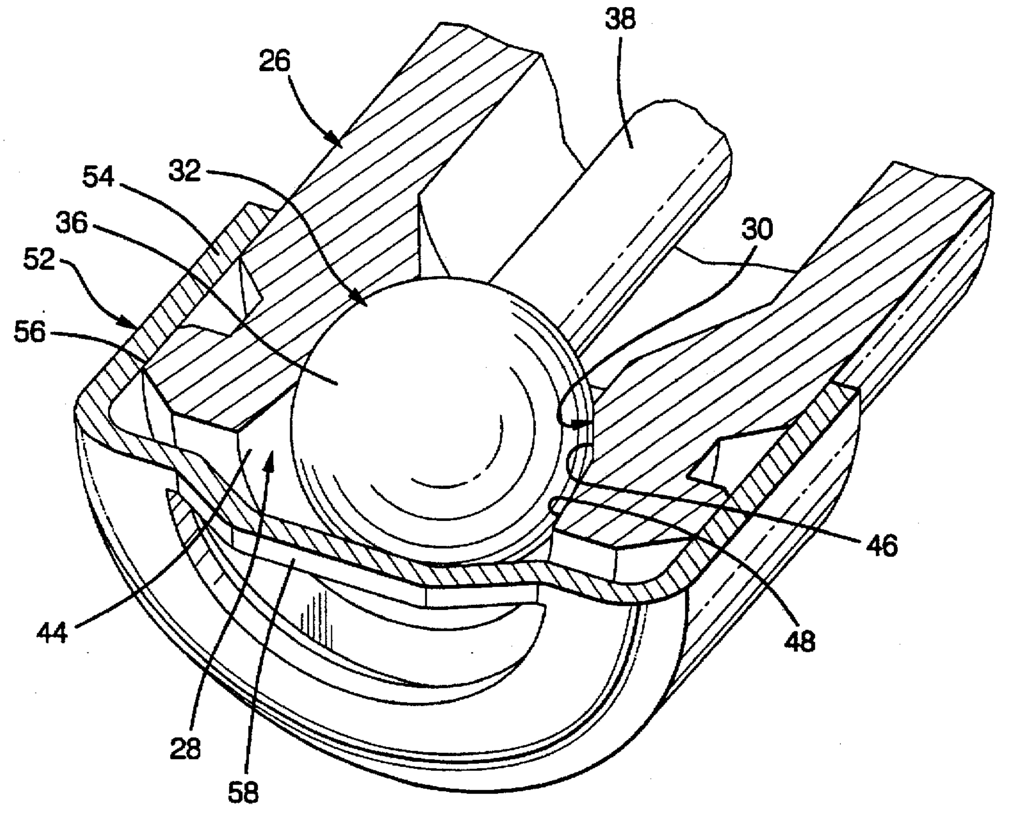
FIG. 3 is an enlarged, sectional, isometric view of a portion of the FIG. 2 nozzle showing additional details of its construction.

As shown in FIGS. 2 and 3, fuel injection nozzle 18 has a tubular nozzle body 22 adapted to receive pulsed, pressurized fuel from an associated fuel injection line 16. The downstream end of the tubular body 22 has an enlarged diameter, bell-shaped portion 24 configured to receive a valve seat body such as tubular seat member 26. The nozzle 18 has a longitudinally extending passage 28 for discharging fuel and an annular valve seat 30 surrounding passage 28. A poppet valve member 32 is engageable with the valve seat 30 to interrupt fuel flow through the passage 28, and a helically coiled extension spring 34 is anchored to tubular body 22 and to the valve member 32 and biases the valve member 32 to engage the valve seat 30. When the pressure differential across valve member 32 reaches a desired level, the valve member is displaced from valve seat 30 to thereby initiate the flow of fuel through the nozzle body fuel passage 28 for discharge from the nozzle 18 to the engine inlet port 20.

Valve member 32 includes a ball 36 forming a valve element that is welded to the shank of a pin 38. The head of pin 38 is surrounded by a section of reduced coils 40 at a first end of the extension spring 39 to thereby anchor the extension spring to the valve member 32. The second end 42 of extension spring 34 engages tubular body 22 thereby anchoring the spring to the body.

Figure 4A:
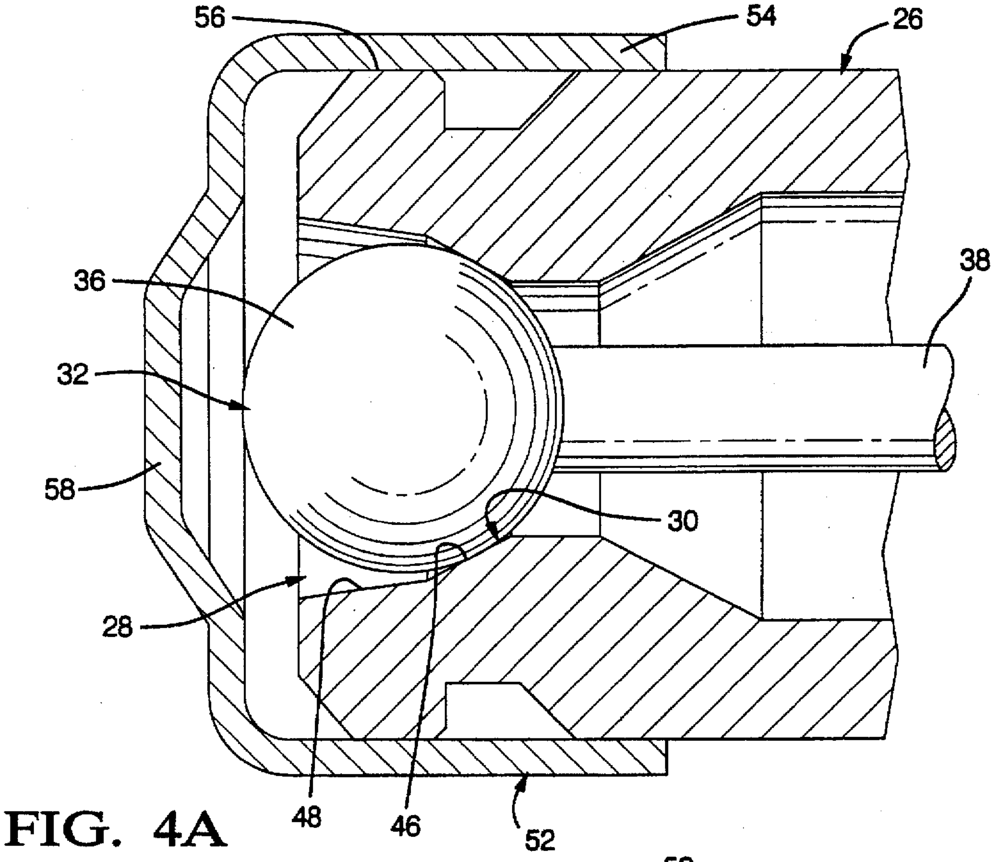
FIGS. 4A, 4B and 4C are enlarged partial sectional views of the nozzle of FIG. 2, illustrating various modes of operation.
Figure 4B:
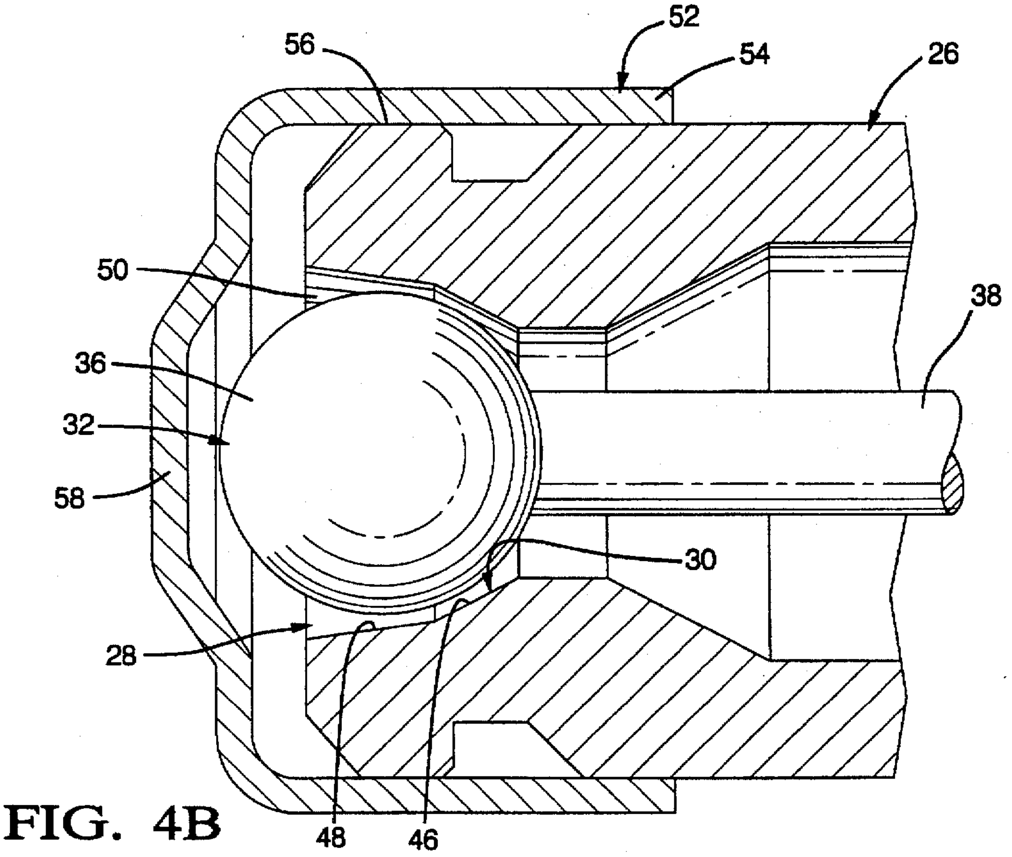
Figure 4C:
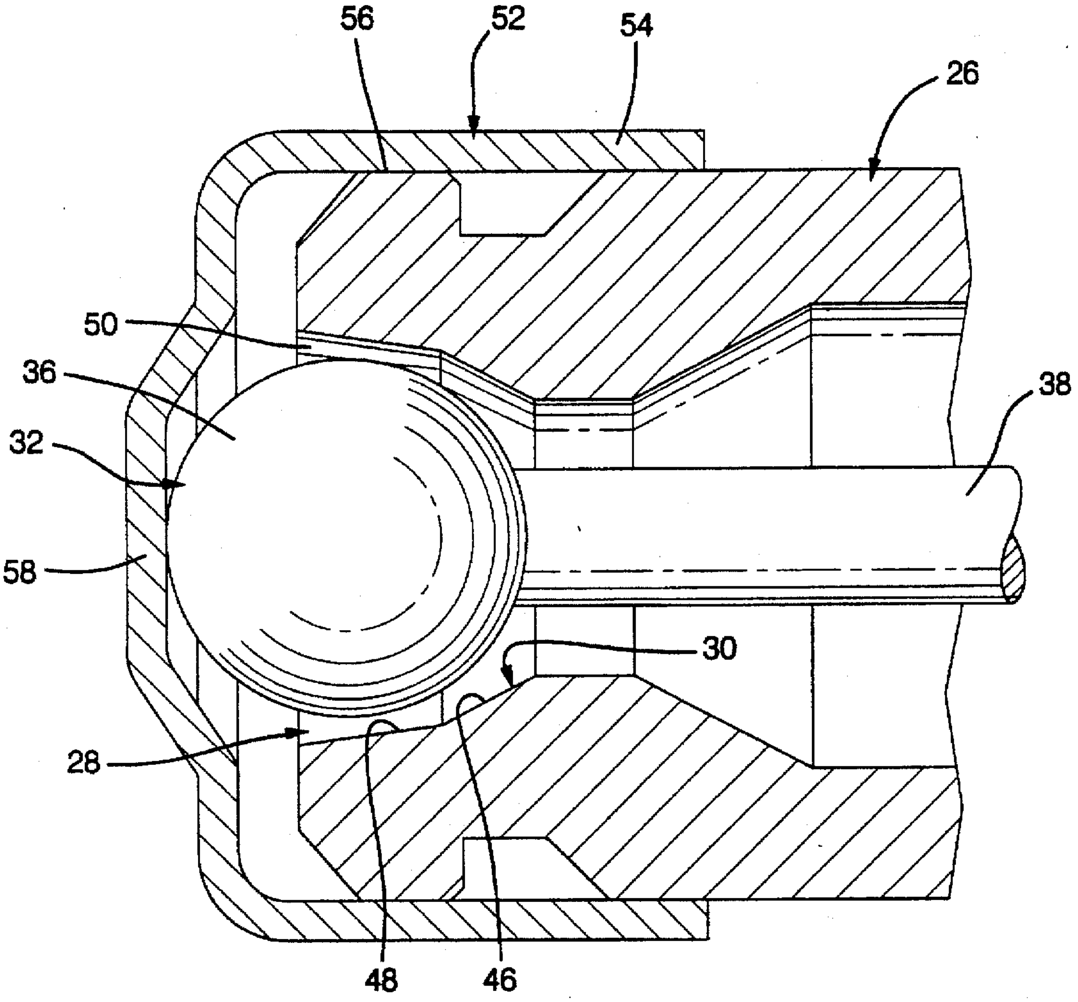

Tubular seat member 26 of nozzle 18 is axially movable relative to the nozzle body 22, allowing adjustment of the length of spring 34 and thus the bias exerted by the spring on valve member 32. This adjustment allows calibration of the pressure differential across the valve member 32 required to initiate movement of the valve off of the valve seat 30. The valve seat 30 which, together with the valve ball 36, serves as the sealing mechanism in nozzle 18, is situated axially inwardly of the outlet end 44 of fuel passage 28. As shown in FIG. 4A, the valve seat 30 is configured with a wide-angle seating surface 46, on the order of 35–90 degrees in order to facilitate opening of the valve. Disposed between the wide-angle valve seating surface 46 of the valve seat 30 and the outlet end 44 of passage 28 is a narrow angle, conical section 48 on the order of 1–15 degrees. As differential pressure across the valve ball 36 reaches a desired level, the valve ball is displaced from the wide angle seating surface 46 of valve seat 30 to thereby initiate the flow of fuel through the nozzle body fuel passage 28 for discharge from the nozzle 18 to the engine inlet port 20. As valve movement and resulting fuel flow is initiated, the valve ball 36 moves axially into the narrow angle, conical section 48 of the valve seat 30, FIG. 4B, where an annular clearance 50 is defined between the valve ball 36 and the narrow-angle conical section 48. The clearance dimension, establishes a restriction to fuel flow around the ball 36 thereby creating a significant drag force on the valve element which is effective to drive the ball 36 axially toward its open position, shown in FIG. 4C.

Received over the downstream end of the tubular seat member 26, adjacent the outlet 44 of fuel passage 28, is a stop member 52. The stop member 52 includes a cylindrical sleeve portion 54 which slides over the outer periphery 56 of the tubular seat member 26 and a diametrically extending stop 58 which extends across the end of the cylindrical sleeve 54 and operates to define the outward, axial range of travel of the valve element 36 of poppet valve member 32 when the element moves outwardly under the urging of a fuel pulse delivered by fuel injector 12. The stop 58 is preferably limited to a single, thin member so as to minimize interference with fuel departure from the nozzle tip. The stop member 52 is axially adjustable, relative to tubular seat member 26, during assembly and calibration to allow for adjustment of ball travel.

When the valve element 36 is driven against the stop 58 under the force of the fuel flow through the annular opening 50, the poppet ceases to operate as a fuel pressure regulator and functions as a fixed metering orifice. The fixed metering orifice function is defined by the perimeter of valve element 36 and the downstream portion of the narrow angle, conical section 48 of the seat element opening 28.

With the valve element 36 held against the stop 58, sensitivity to variations in supply fuel pressure are significantly reduced. The reduction in sensitivity has a direct relation to fueling accuracy which is an important attribute of fuel system performance due to its direct impact on vehicle emission levels. Additionally, the supply pressure for the fuel system may be subject to significant reduction thereby limiting the load placed on the fuel pump resulting in lower cost, noise and increased durability.

The tendency for an unrestrained poppet nozzle 18 to over-respond to an input pressure is eliminated by the direct, limiting contact between the valve element 36 and the stop 58. Elimination of over-response provides an improved linear response by improving accuracy of fuel delivery during the valve opening event. Additionally, the application of the stop member 52 to the nozzle 18 eliminates valve resonance which may be prevalent in systems with unrestrained valves which are subject to movement caused by instability in supply fuel pressure.

Spray consistency is assured by the application of the downstream stop member 52. Such consistency is realized since the stop member 58 fixes the location of the poppet ball valve 36 relative to the outlet 44 of the fuel passage 28 thereby eliminating fuel spray variation from pulse to pulse.

The fuel distribution line 16 of the fuel system 10 is slipped over the upstream end of the tubular body 22. Nozzle 18 also may include a molded rubber mounting bushing 60 with a central bore 62 that embraces the fuel line 16. Within the bore 62, an annular groove 64 receives a peripheral locating flange 66 formed on the body 22 to retain the body within the bushing 60.

Bushing 60 is mounted in an aperture 68 in the wall of inlet port 20 and may include a series of peripheral beads 70 which operate to engage the aperture 68 to retain and seal bushing 60 therein.

The foregoing description of the invention has been presented for the purpose of illustration and description. It is not intended to be exhaustive, nor is it intended to limit the invention to the precise form disclosed. It will be apparent to those skilled in the art that the disclosed embodiments may be modified in light of the above teachings. The embodiments described were chosen to provide an illustration of the principles of the invention and its practical application to thereby enable one of ordinary skill in the art to utilize the invention in various modifications as are suited to the particular use contemplated. Therefore the foregoing description is to be considered exemplary, rather than limiting, and the true scope of the invention is that described in the following claims.

We claim:

1. A fuel injection nozzle adapted to receive pressurized fuel pulses from a source comprising a nozzle body having a fuel passage extending longitudinally from a first, upstream end to a second, downstream end, an annular valve seat surrounding said fuel passage adjacent said second, downstream end, a valve member, movable between opened and closed positions relative to said valve seat to establish fuel flow through said passage, said valve seat including an angled seating surface for sealing engagement with said valve member and a conical end portion extending between said angled seating surface and said second, downstream end of said passage, said conical end portion having an angle less than that of said angled seating surface, said valve member operable between a first, closed position against said angled seating surface, a second, intermediate position in which said valve member and said conical portion operate to define an annular clearance operable as a restriction to fuel flow around said valve to thereby establish a drag force on said valve to move said valve away from said first, closed position and a third, open position.

2. A fuel injection nozzle adapted to receive pressurized fuel pulses from a source comprising a nozzle body having a fuel passage extending longitudinally from a first, upstream end to a second, downstream end, an annular valve seat surrounding said fuel passage adjacent said second, downstream end, a valve member, movable between opened and closed positions relative to said valve seat to establish fuel flow through said passage and a valve stop, downstream of said valve member, to define, relative to said valve seat, an axial range of travel for said valve member within said fuel passage, said valve seat including an angled seating surface for sealing engagement with said valve member and a conical end portion extending between said angled seating surface and said second, downstream end of said passage, said conical end portion having an angle less than that of said angled seating surface, said valve member operable between a first, closed position against said angled seating surface, a second, intermediate position in which said valve member and said conical portion operate to define an annular clearance operable as a restriction to fuel flow around said valve to thereby establish a drag force on said valve to move said valve away from said first, closed position and a third, open position against said downstream stop, said valve and said second, downstream end of said longitudinal passage defining a fuel metering orifice therebetween to thereby regulate the flow of fuel through said nozzle body.

* * * * *